Aug. 8, 1944.　　　　H. K. MOORE　　　　2,355,317
VARIABLE PITCH PROPELLER ASSEMBLY
Filed May 22, 1942
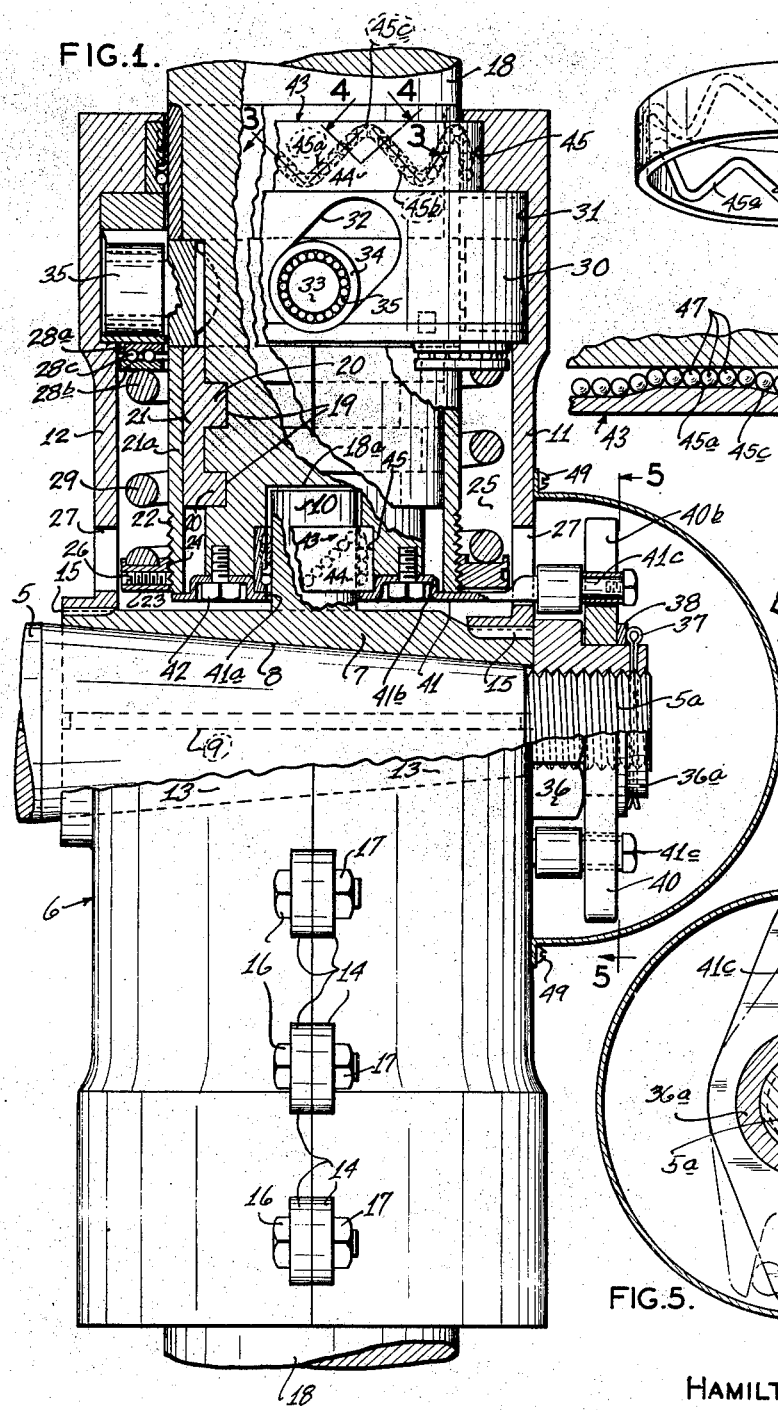
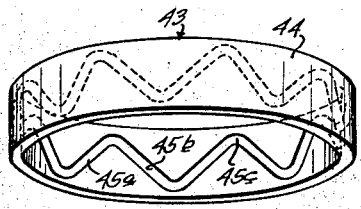
FIG. 2.
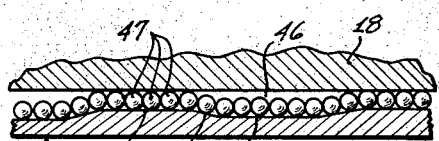
FIG. 3.
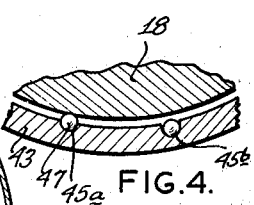
FIG. 4.
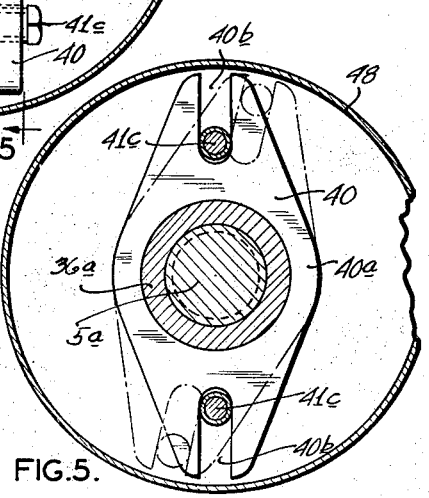
FIG. 5.
INVENTOR.
HAMILTON K. MOORE
BY
A.E.Fisher
ATTORNEY Patented Aug. 8, 1944

2,355,317

UNITED STATES PATENT OFFICE 2,355,317

VARIABLE PITCH PROPELLER ASSEMBLY

Hamilton K. Moore, St. Louis, Mo.

Application May 22, 1942, Serial No. 444,012

3 Claims. (Cl. 170—162)

This invention relates to changeable pitch propellers for airplanes, and wherein the change of pitch is accomplished or accompanied by an outthrust or centrifugal movement of the propellers for turning the blades more flatly to the air stream, and a corresponding centripetal movement of the propellers for turning the blades edgewise to the air stream. In such centrifugal and centripetal movement of the blades, there is of course some friction at the shanks of the blades where they engage their bearings in the hub, this friction being the resultant of both the rotative and radial or longitudinal movements of the propellers in and through their bearings.

It is a prime purpose of the present invention therefore to provide a form of anti-friction ball bearing adapted to accommodate simultaneously both the rotative and centrifugal or radial movement of a propeller blade as journaled at its shank into the hub of an airplane propeller.

Another object is to provide an airplane propeller including a hub at the end of an engine shaft, and propeller blades having shanks journaled laterally into opposite sides of the hub and adapted also to radial movement or extension through their bearings, the said bearings being ball bearings composed of balls rolling in angular or convolute race-ways and thus adapted to accommodate simultaneously both the rotative and radial or centrifugal movements of the propeller.

A further object of the invention is to provide a simple and efficient means for operatively yoking together a pair of changeable pitch propeller blades as rotatably journaled at their shanks in the hub of a propeller, so that the pitch of the two blades will change or vary in unison and to the same degree.

The foregoing and other objects are accomplished through the mechanism and devices described in the specification and illustrated in the drawing, wherein:

Figure 1 is a plan view, partly in section, of a propeller assembly in accordance with this invention, mounted at the end of an engine drive shaft, and showing the inner ends of a pair of blade shanks journaled in opposite sides of the hub.

Figure 2 is a perspective view on an enlarged scale, of one of the bearing rings, showing the formation of the ball bearing groove or race around the inner face thereof.

Figure 3 is a fragmentary section on an enlarged scale, on the line 3—3 of Figure 1.

Figure 4 is a fragmentary section, on an enlarged scale, on the line 4—4 of Figure 1.

Figure 5 is a cross section on the line 5—5 of Figure 1.

As shown in the drawing, the invention is mounted upon the tapered forward end of the engine drive shaft 5 of an airplane (not shown), and comprises a hub assembly referred to generally at 6. This hub assembly or unit includes a sleeve 7 formed with an axial, tapered bore 8, adapted to snugly receive the tapered end of the shaft 5, and upon which it is rigidly keyed as indicated at 9. Heavy cylindrical studs or knobs 10, preferably formed integrally with the sleeves 7, are extended medially therefrom at diametrically opposite sides thereof. Pairs of frontal and rear half-cylindrical propeller shank sockets or casings 11 and 12, each pair joined by integrally formed sleeve engaging rings or bands 13, and formed with spaced and aligned ears 14 along their margins, are keyed as indicated at 15 upon the sleeve 7, over the ends thereof, and are rigidly joined together at their meeting margins by bolts 16 passed through the ears 14, and secured by nuts 17 turned thereon.

The journaled shanks 18 of the propeller blades (not shown) are axially and cylindrically recessed or cupped out, as at 18a, for freely engaging the knobs 10 of the sleeves 7, and are mortised annularly on their sides, as at 19, for engaging complemental mortises 20 of the parted or segmental bands 21 seated on the shank ends. Outer cylindrical shells or ferrules 21a are then passed snugly over the segments 21 and are welded or otherwise secured thereto, thus forming a rigid and unitary structure.

The inner ends of the ferrules 21a are exteriorly screw-threaded as at 22 for threadedly engaging flattened pressure rings or spring seats 23, complementally threaded on their inner faces, as at 24. The shank ends are passed freely into their sockets at each side of the hub unit 6 formed by the casings 11 and 12, and the rings 23 are turned upon the threaded inner ends of the ferrules 21a, and within the annular spaces 25 here provided between the ferrules and the outer casings 11 and 12. Set screws 26 are passed through the rings for locking them on the ferrules at any desired point of travel, and apertures 27 are cut through the casings 11 and 12 for inserting and turning the screws and adjusting the rings, as well as for other purposes to be later explained.

Plain, annular ball-bearing assemblies or units are seated in the outer ends of the annular spaces or spring chambers 25 around the ferrules 21a, the same including the outer races or rings 28a anchored fixedly in place, the inner races or rings 28b which are left free to rotate, and the balls 28c between the two.

Coiled pressure springs 29 are seated over the ferrules 21a, within the spring chambers 25, the springs being braced at their ends between the inner spring seats or rings 23 and the outer ball races 28. The normal action of these springs is to urge the propeller blades inward to their limit, through their sockets, and pressure of these springs may be increased or lessened as desired, by turning the rings 23 outward or inward on the ferrules 21a.

Torque rings 30 freely encircle the ferrules 21a outwardly of the ball races 28, these rings being anchored fixedly within annular recesses 31 formed around the inner walls of the socket casings 11 and 12, and torque slots 32 are formed in these rings, the slots being elongated angularly relative to the median planes of the rings. The degree of such angularity is approximately forty-five degrees, as shown in the drawing. Short torque studs or spindles 33 are seated in the journals of the shanks 18 and projected medially through the slots 32. Roller rings 34 are seated over these studs upon interposed roller bearings 35. Thus in the operation of the propeller, the blades and blade shanks will tend to move outwardly under the centrifugal pull and simultaneously to rotate partially by reason of the travel of the rollers 34 in the angularly extended slots 32, thus turning the blades and varying their pitch more or less flatly or obliquely to the air stream, and until there is the required balance or adjustment between the speed of the propeller and the load carried. This adjustment may be aided by turning up or unturning the pressure rings 23 for increasing or reducing the inward urge of the springs 29 upon the propellers.

The hub and propeller assemblies so far described are removably secured in place on the engine shaft 5 by means of a heavy nut 36 turned upon the threaded extremity 5a of the shaft and secured against loosening by a cotter pin 37 passed through the forwardly reduced and rounded portion 36a of the nut and through the end of the shaft. A washer 38 may be interposed between the cotter pin and the shaft end. The round or journaled portion 36a of the nut serves a purpose now to be described.

In order that the propellers and shanks 18 may operate and turn or vary their pitch in unison, a flat, elongated rocker arm 40 is provided, and bored through at its central widened portion as at 40a, for freely receiving the journal 36a of the nut 36, and whereby it is rockably mounted on said journal inside of the retaining washer 38. The arm 40 is also formed at its ends with lever slots 40b which open out through the ends of the arm and are elongated straightly inward, in alignment. Flat, elongated torque arms or levers 41 are formed with round apertures 41a for freely passing the sleeve knobs 10 into the shank cups 18a, and with screw sockets 41b which are counter-sunk into the shank ends and whereby the levers are anchored to the ends by screws 42 passed through the sockets and into the shank ends. The forward ends of the levers 41 are extended out through the frontal apertures 27 in the casings 11, and their outer ends are rounded to form fingers 41c which are disposed freely within the slots 40b of the rocker arm 40. By this mechanism the two propeller blades and shanks 18 are yoked together, so that they are turned reversely and in unison through the fingers 41c playing in the slots 40b of the arm 40 and rocking that arm clockwise or the reverse, as determined by the rotative movements of the propellers moving radially or longitudinally in their sockets, under the rotative action of the rollers 34 traveling in the torque slots 32.

In order to reduce to a minimum the frictional drag of the shanks 18 in their sockets, a special form of combination thrust and torque bearing is employed and mounted on the inner and outer ends of the shanks. These inner and outer bearings are indicated generally at 43 and are identical in structure though of different size, the inner bearings being of smaller diameter than the outer, as clearly apparent in the drawing. This variation in diameter arises from the fact that the inner bearings embrace the reduced cylindrical knobs 10 at the axially extended inner ends of the shanks, while the outer bearings embrace the shanks at their full diameters of the shanks at their points of emergence from their sockets. In either case the bearing units 43 comprise race rings or bands 44 anchored within annular recesses 45 formed in the surrounding casings 11 and 12, which form the shank sockets, and thus closely but freely engaging the shanks in a spaced relation. The race rings or bands 44 are angularly grooved out on their inner peripheries on a zig-zag, or sinuous pattern, as clearly shown at 45a—45b—45c in Figure 2, to form ball races 46. As here shown the axes of the grooves 45a—45b intersect at an angle of about 45 degrees and are curvedly joined at their meeting points or intersections by the bight portions 45c. Of course the stated angularity may be varied as desired in practice. The parallel grooves or branches 45a are formed a trifle shallower than the other parallel grooves or branches 45b, as shown in Figure 3, and the connecting bights 45c are beveled down at their ends, at bottom as shown, for connecting the grooves 45a—45b, all for a purpose to be pointed out. These ball races or grooves as described are entirely filled with balls 47 with just enough play to allow them to move freely along through the grooves of the races, and thus complete the bearings for the shanks 18.

Viewing Figure 1, and supposing the propeller blades to be turning clockwise as viewed from the pilot's seat, and with the blades supported from or along their leading edges, it appears that the centrifugal force of the whirling blades will urge them outward through the ball bearings 43, and that the torque studs moving outward in the slots 32 will simultaneously partially rotate the blades more flatly to the air stream. The resultant of this combined outward thrust and rotation of the blades is defined by the angularity of the shallow grooves 45a of the races and hence the shanks 18 ride upon the balls 47 at the moment disposed in these grooves. As these balls move outwardly with the shanks, the balls at the bights 45c roll into the deeper and reversed grooves 45b of the races, free of contact with the shanks and hence offering no frictional resistance whatever to the outward and rotative movement of the shanks, as would otherwise be the case. On the reverse or inward movement of the propellers, the balls would of course reverse their travel and move from the deeper grooves up into the shallower grooves, and would thus serve their normal function as ball bearings for the shafts.

A cupped nose casing 48 is bolted at 49 to the frontal casings 11 of the assembly.

From the foregoing description it is thought that the construction, use and operation of the invention and its several elements will be readily understood. Any desired modifications in the structures shown may be made, within the scope of the claims.

I claim:

1. In combination, a changeable pitch propeller, including propeller blades having their shanks journaled radially in a hub and adapted also to radial movement in the hub in the process of changing their pitch, combined thrust and torque ball bearings for the propeller shanks, same comprising race-rings seated in the hub in spaced relation and embracing the propeller shanks, the said rings having tortuous and angular ball races formed around their inner peripheries, and balls filled into the said races to complete the bearings for the propeller shanks.

2. In an assembly according to claim 1, the said ball races including relatively shallow parallel grooves for carrying the balls immediately supporting the propeller shanks, and relatively deeper connected grooves for freely receiving balls as discharged from the shallow grooves under the movements of the shanks.

3. In a changeable pitch propeller unit, including a hub formed with radially disposed sockets and propeller blades having their shanks journalled into said sockets of the hub, combined thrust and torque ball bearings within the sockets of the hub for receiving the shank journals of the propellers, the said ball bearings comprising continuous grooves extended tortuously around the inner peripheries of the hub sockets, alternate portions of said grooves being relatively shallow and the remaining portions relatively deep, whereby balls as filled into the grooves will function to support the shaft journals at the shallow portions, and will fall free therefrom at the deep portions of the grooves.

HAMILTON K. MOORE.